Patented Apr. 13, 1954

2,675,327

UNITED STATES PATENT OFFICE 2,675,327

HEAT STABLE PLASTIC COMPOSITION CONTAINING LOWER FATTY ACID ESTER OF CELLULOSE

William M. Gearhart, Kingsport, Tenn., assignor to Eastman Kodak Company, Rochester, N. Y., a corporation of New Jersey No Drawing. Application November 15, 1949, Serial No. 127,514

8 Claims. (Cl. 106—176)

This invention relates to self-extinguishing organic acid esters of cellulose plastic compositions including trichlorethyl phosphates therein and bis glycidyl ethers of polyhydroxy benzenes as the stabilizers therefor.

Various types of cellulose ester compositions, such as consisting of cellulose acetate and plasticizer, have been employed for molding purposes, but these compositions have been found to be unsuitable for purposes requiring a high degree of flame resistance. Triphenyl phosphate has been employed in cellulose ester compositions for plasticizing and although that compound often reduces the inflammability of the resulting composition, the compositions are not self-extinguishing. Also, in the softer flows of plastic triphenyl phosphate readily exudes therefrom in the softer types of flows. Tri-monochlorethyl phosphate has previously been considered for plasticizing and reducing the inflammability of cellulose ester compositions, but this material has been characterized in molding operations by the release of small quantities of HCl contributing to the corrosion of the apparatus employed. Also, when employed as the only plasticizer, the resulting plastic has been found to have properties which are not particularly desirable. Tri-monochlorethyl phosphate has a high degree of solvent power for cellulose acetate, for instance. However, if used as the sole plasticizer for the cellulose acetate in an amount in which plasticizers are usually used to obtain the commercial flow range (25–50 parts of plasticizer per 100 parts of cellulose acetate by weight), the resulting plastic material is ordinarily too brittle for best results in injection molding. This brittleness can be overcome by using with the chlorethyl phosphate some other plasticizer in a proportion such that the other plasticizer constitutes 25–50% by weight of the total plasticizing composition. Some of the other plasticizers which may be employed along with the chlorethyl phosphate are cresyl diphenyl phosphate, triphenyl phosphate, tricresyl phosphate which themselves have some flame-proofing properties or other plasticizers such, for instance, as the dialkyl phthalates, the sulfonamides and the ethoxyethyl esters of adipic and sebacic acids. Ordinarily when non-phosphate plasticizing materials are used along with the chlorethyl phosphate, it is desirable to use a proportion of the chlorethyl phosphate in the upper part of the 50-75% range specified therefor.

Tri-monochlorethyl phosphate does not exhibit the stability to heat at molding temperatures which is exhibited by the commonly used plasticizers causing the generation of HCl which may cause corrosion of the molding apparatus or breakdown of the cellulose ester. This generation of HCl is sufficiently objectionable that in many instances heretofore chlorethyl phosphates have not been considered as useful for plasticizers in plastic compositions even though that material exhibits flame-resistant properties.

One object of my invention is to provide plastic compositions exhibiting resistance to fire. Another object of my invention is to provide plastic compositions in which trichlorethyl phosphates can be used for plasticizing and imparting flame resistance without any breakdown therefrom. A further object of my invention is to provide plastic compositions using chlorethyl phosphates in which glycidyl ethers of polyhydroxy benzenes are employed for the purpose of assuring stability in the composition. Other objects of my invention will appear herein.

I have found that in plastic compositions in which the major proportion of the plasticizer is tri-monochlorethyl phosphate that the addition of a small proportion of a glycidyl ether of a poly non-adjacent hydroxy benzene thereto results in completely inhibiting the formation of any decomposition products therein when the composition is molded. I have found that such compositions when employed in injection molding processes give plastic products having high impact strength, good durability, freedom from cracking, and brittleness, and good stability.

The compositions in accordance with my invention are made up of 100 parts of an organic acid ester of cellulose, such as cellulose acetate, cellulose acetate propionate, cellulose acetate butyrate, cellulose propionate, or cellulose butyrate. The cellulose acetates which are particularly useful in my compositions are those having acetyl contents of 38–41% although my invention is not limited thereto. Cellulose acetate butyrates which are useful as the esters in plastic compositions in accordance with my invention are those having butyryl contents of from 35 to 55%. For instance, a cellulose acetate butyrate of approximately 37% butyryl is useful therein. Cellulose acetate propionates having propionyl contents of 42–48% are very useful in compositions in accordance with my invention. It is to be understood, however, that the proportions of acetyl, propionyl, and butyryl in the esters listed may be varied as desired by the individual operator. With the 100 parts of cellulose ester 20–70 parts of plasticizer of which 50–75% is tri-monochlorethyl phosphate is employed. The remainder of the plasticizer may be one of the plasticizers listed above or any other plasticizer which is ordinarily recognized as useful in plasticizing the particular cellulose ester under consideration. As the phosphate plasticizers are especially useful in this connection, their use in conjunction with the chlorethyl phosphate is particularly desirable. Also included in the composition is 5–20% of a bis glycidyl ether of a poly non-adjacent hydroxy benzene based on the trichlorethyl phosphate which is employed. Some examples of useful compounds for this purpose are the bis glycidyl ethers of hydroquinone and of resorcinol. If desired, magnesium carbonate may be incorporated in the composition, the permissible proportion being 0–0.6 part thereof. If magnesium carbonate is to be employed, a useful range is 0.3–0.6 part although as little as 0.03 part thereof may be employed. As it appears that the magnesium carbonate assists the glycidyl ether in stabilizing the chlorethyl phosphate, ordinarily the proportion of glycidyl ether used in conjunction with the magnesium carbonate is less than when used in the absence of the magnesium carbonate.

Compositions in accordance with my invention are useful in any situation in which high resistance to flame is useful. One such purpose is in the manufacture of oddly shaped and colored light bulbs for ornamental purposes, such as in Christmas tree decorating. Such light bulbs are commonly used in close proximity to highly inflammable material, such as the dry branches of evergreens and it is important that the plastic should not contribute further flammability to the decorative ensemble. A typical flameproof composition is the following:

100 parts cellulose acetate (38.5–40.5% acetyl)
20 parts trichlorethyl phosphate
20 parts cresyl diphenyl phosphate
1 part hydroquinone bis glycidyl ether
0.5 part magnesium carbonate Various compositions were prepared in accordance with my invention and tested to stability or resistance to breakdown on heating. This value was measured by A. S. T. M. method D569—48 described in A. S. T. M. standards 48, supplement, part 3B, page 13. In this test the plastic is heated for one hour at 205° C. The flow should not break down more than one or two flows by this heating. Also, the samples were tested for color, the lower the number, the better the color in every instance. The various compositions which were prepared and tested were as follows in each case using 100 parts of cellulose acetate of 39% acetyl as the cellulose ester.

| Parts Plasticizer | Plasticizer | Parts Stabilizer | Flow | | | 205° C. Heat Test Color | |
|---|---|---|---|---|---|---|---|
| | | | Original | 1 Hr. at 205° C | 2 Hrs. at 205° C | 1 Hr. | 2 Hrs. |
| 40 | Trichlorethyl Phosphate; Triphenyl Phosphate. | None | M | $S_2$ | Unstable | 130 | Black Liquid. |
| 40 | do | 3 Hydroquinone Bis Glycidyl Ether; 0.03 Magnesium Carbonate. | M | M | M | 50 | Lt. Brown. |
| 40 | do | 2 Hydroquinone Bis Glycidyl Ether; 0.5 Magnesium Carbonate. | MS | MS | MS | 50 | 130. |
| 40 | do | 1.0 Hydroquinone Bis Glycidyl Ether; 0.5 Magnesium Carbonate. | MS | MS | MS | 60 | 130+. |
| 40 | Trichlorethyl Phosphate; Cresyl Diphenyl Phosphate. | 2 Hydroquinone Bis Glycidyl Ether; 0.5 Magnesium Carbonate. | MS | MS | MS | 45 | 70. |
| 40 | Trichlorethyl Phosphate; Tricresyl Phosphate. | do | MS | MS | MS | 50 | 80. |
| 36 | Trichlorethyl Phosphate; Cresyl Diphenyl Phosphate. | do | $H_2$ | $H_2$ | H | 50 | 80. |
| 36 | do | 2 Resorcinol Bis Glycidyl Ether; 0.5 Magnesium Carbonate. | $H_2$ | $H_2$ | H | 50 | 130. |

It may be seen from the above table that whereas without the stabilizer the flow character drops from medium (M) to the second degree of softness ($S_2$) on heating for one hour at 205° C. the compositions including the stabilizer did not change any in flow characteristics on heating for one hour and at the end of two hours was changed little, if any. It may also be seen that heating did not have any considerable effect upon the color in the case of the compositions containing stabilizer therein in accordance with my invention.

I have also found that in the case of some plasticizers, particularly the esters of lower aliphatic alcohols or cyclohexanol and organic dicarboxylic acids of 6–10 carbon atoms that sometimes minute amounts of impurities may be present therein which will cause instability of the plasticizers, and that such plasticizing esters may be stabilized by incorporating therein a small proportion of a glycidyl ether. Some of the plasticizers which evidence this instability and which are representative of the esters of the type referred to are dibutyl sebacate, dibutyl phthalate, diethyl phthalate, and dicyclohexyl phthalate. I have observed that quite frequently plasticizing esters of this type are not resistant to the effects of heat, such as above a temperature of 150° C. for any appreciable length of time. This instability interferes with the use of these esters in any connection in which they are subject to elevated temperatures for any appreciable period of time. Such uses might include heat transfer liquids or in admixture with high polymeric materials for preparing plastic compositions which are molded under elevated temperature conditions, such as 200–250° C., as would be met with in injection molding processes. Also, plastic compositions in which these esters are used as plasticizers have been suggested for melt-coating operations, and it is undesirable in those operations that plasticizers be employed which exhibit instability to heat. I have found that by incorporating in esters of the type described a small proportion of a glycidyl ether of the type described herein in a proportion of 0.02% to 0.5% based on the plasticizer, that stability of the plasticizer is obtained.

That a plasticizer is unstable may be determined by a filter paper test in which ashless filter paper is immersed in the plasticizer or ester at 180° C. for one hour. For example, 5 ml. of the ester to be tested may be placed in an 18 x 150 mm. Pyrex tube and a 0.5 x 2" strip of an ashless filter paper is inserted so that the strip is about half immersed in the sample. The tube is then heated and the contents are left unstoppered for one hour in an oil bath at 180° C. The color of the test filter paper is compared to that of a standard, which standard is a very light brown and is obtained by immersing a strip of the same type of ashless filter paper for ten seconds in 0.01 N iodine solution and then immediately comparing its color to that of the test filter paper. The ester to be of satisfactory stability must exhibit a color better than, or at least equal to, the standard in the above test or, in other words, the white ashless filter paper is discolored no more than a yellow brown when heated with the ester.

This test was applied to two lots of dibutyl phthalate which was unstable to heat, both to the dibutyl phthalate itself and to the dibutyl phthalate mixed with glycidyl ether. The results obtained were as follows:

| | Filter Paper Test—Color |
|---|---|
| Dibutyl Phthalate—Lot 1 | Dark brown. |
| Dibutyl Phthalate—Lot 2 | Black. |
| Lot 1 + 0.05% bis glycidyl ether hydroquinone | Light yellow-brown. |
| Lot 2 + 0.05% bis glycidyl ether hydroquinone | Do. |
| Lot 1 + 0.1% bis glycidyl ether hydroquinone | Do. |
| Lot 2 + 0.1% bis glycidyl ether hydroquinone | Do. |

I claim:

1. A stable self-extinguishing plastic composition comprising 100 parts by weight of a lower fatty acid ester of cellulose, 20–70 parts by weight of a plasticizer mixture of which 50–75% is tri-monochlorethyl phosphate, 5–20%, based on the tri-monochlorethyl phosphate, of a bis glycidyl ether of a di non-adjacent hydroxy benzene and 0–0.6 part of magnesium carbonate.

2. A stable self-extinguishing plastic composition comprising 100 parts by weight of cellulose acetate, 20–70 parts by weight of plasticizer of which 50–75% is tri-monochlorethyl phosphate, 5–20%, based on the chlorethyl phosphate, of hydroquinone bis glycidyl ether and 0–0.6 part of magnesium carbonate.

3. A stable self-extinguishing plastic composition comprising 100 parts of a lower fatty acid ester of cellulose, 20–70 parts of plasticizer of which 50–75% is tri-chlorethyl phosphate and 5–20%, based on the trimonochlorethyl phosphate of a bis glycidyl ether of a di non-adjacent hydroxy benzene.

4. A stable self-extinguishing plastic composition comprising 100 parts of a lower fatty acid ester of cellulose, 20–70 parts of plasticizer of which 50–75% is tri-monochlorethyl phosphate, the remainder being a polyphenyl phosphate plasticizer, and 5–20%, based on the chlorethyl phosphate, of hydroquinone bis glycidyl ether.

5. A stable self-extinguishing plastic composition comprising 100 parts of cellulose acetate, 20–70 parts of a plasticizer mixture of which 50–75% is tri-monochlorethyl phosphate, the remainder being a polyphenyl phosphate and 5–20% based on the chlorethyl phosphate, of hydroquinone bis glycidyl ether.

6. A stable self-extinguishing plastic composition essentially consisting of 100 parts of a lower fatty acid ester of cellulose, 20–70 parts of plasticizer of which 50–75% is tri-monochlorethyl phosphate, 5–20%, based on the chlorethyl phosphate, of hydroquinone bis glycidyl ether and 0.3–0.6 part of magnesium carbonate.

7. A stable self-extinguishing plastic composition comprising 100 parts of cellulose acetate, 20–70 parts of a plasticizer of which 50–75% is tri-monochlorethyl phosphate and 5–20%, based on the chlorethyl phosphate, of resorcinol bis glycidyl ether.

8. A stable self-extinguishing plastic composition comprising 100 parts of cellulose acetate, 20 parts of tri-monochlorethyl phosphate, 20 parts of cresyl diphenyl phosphate, one part of hydroquinone bis gylcidyl ether and 0.5 part of magnesium carbonate.

References Cited in the file of this patent

UNITED STATES PATENTS

| Number | Name | Date |
|---|---|---|
| 1,067,785 | Lindsay | July 15, 1913 |
| 2,330,251 | Taylor | Sept. 28, 1943 |
| 2,417,281 | Wasson et al. | May 11, 1947 |
| 2,453,634 | Marple | Nov. 9, 1948 |
| 2,467,171 | Werner | Apr. 12, 1949 |

FOREIGN PATENTS

| Number | Country | Date |
|---|---|---|
| 475,523 | Great Britain | Mar. 18, 1937 |

OTHER REFERENCES

"Uses and Applications and Related Materials," Gregory, vol. II (1944), page 104.